United States Patent [19]

Bergmann

[11] Patent Number: 5,377,900

[45] Date of Patent: Jan. 3, 1995

[54] METHOD OF PRECISELY POSITIONING AND MATING TWO WORKPIECES

[75] Inventor: Ernest E. Bergmann, Fountain Hill, Pa.

[73] Assignee: AT&T Corp., Murray Hill, N.J.

[21] Appl. No.: 175,062

[22] Filed: Dec. 29, 1993

[51] Int. Cl.[6] .................. B23K 31/02; B23K 101/36
[52] U.S. Cl. ..................... 228/124.1; 228/123.1; 228/138; 228/212
[58] Field of Search ............... 228/122.1, 123.1, 124.1, 228/138, 179.1, 180.22, 212, 44.7, 49.5

[56] References Cited

U.S. PATENT DOCUMENTS

| | | |
|---|---|---|
| 4,907,733 | 3/1990 | Pratt et al. ............ 228/124.1 |
| 4,962,446 | 10/1990 | Asakura et al. ......... 228/138 |
| 5,215,244 | 6/1993 | Buchholz et al. ........ 228/124.1 |

OTHER PUBLICATIONS

Wade, Michael J. and Edge, Colin, "Self-Aligned Flip-Chip Assembly of Photonic Devices with Electrical and Optical Connections", *IEEE Transactions on Components, Hybrids, and Manufacturing Technology*, vol. 13, No. 4, Dec. 1990, pp. 780-786.

Petersen, Kurt E., "Silicon as a Mechanical Material", *Proceedings of the IEEE*, vol. 70, No. 5, May 1982, pp. 420-457.

*Primary Examiner*—Samuel M. Heinrich

[57] ABSTRACT

A method of mechanically mating two workpieces when one of the workpieces lacks physically matable surface characteristics. An adaptor is formed through crystallographic etching techniques and is precisely positioned and mounted to the surface of the workpiece lacking physical features in order to provide mechanical points of contact for mating with the other workpiece. Solder points are formed on the surface of the workpiece and the adaptor by photolithographic metalization. The adaptor is then solder bump mounted to the surface of the workpiece for highly precise positioning. The adaptor forms precisely positioned points of contact for mechanical mating with the physical features of the other workpiece.

28 Claims, 4 Drawing Sheets

METHOD OF PRECISELY POSITIONING AND MATING TWO WORKPIECES

FIELD OF THE INVENTION

This invention relates to a method of precisely positioning, orienting and physically mating opposing surfaces of two workpieces by direct mechanical contact when one of the workpieces to be mated lacks mechanically matable features. Such workpieces are commonly encountered in the manufacture of semiconductor and opto-electronic circuitry and components.

BACKGROUND OF THE INVENTION

The current explosion in the use of fiber optic technology in electronic subcomponents for telecommunications and data processing is well recognized and has been well document in the art. Along with the increased use and availability of integrated optical circuits and other opto-electronic (OE) components, widely varied connectors, interfaces and packaging techniques have also come into widespread use. A common requirement of all such devices, however, is the highly precise placement and retention of components requiring optical coupling. Examples of such are the positioning of fiber optic wave guides relative to laser array chips and the alignment of light emitting diodes (LEDs) with sapphire ball lenses, to name just a few.

The well known and often used technique of solder bump mounting has heretofore provided a vehicle for critical placement and orientation of certain components as applied to a single, common substrate or other workpiece surface. The precision and advantages afforded by solder bump mounting are, however, not available when the items requiring alignment are parts of separate sub-assemblies which will not or cannot be solder bump mounted together, but can only be held in place by an adhesive, mechanical pressure or other such means of attachment. Such techniques do not afford a mechanism for accurate alignment of these separate parts.

There is, therefore, an urgent and critical need in the art for a method of aligning components with a precision approaching that of solder bump mounted components, but affording the flexibility of mating these components by methods other than conventional solder bump mounting. The present invention provides such a method.

SUMMARY OF THE INVENTION

The method of the present invention affords the practitioner a way to take advantage of the precision and reproducibility of solder bump mounting for the alignment and mating of components which, for various design reasons, cannot themselves be solder bump mounted together.

To achieve this critical alignment, an adaptor is developed for mating with certain known surface characteristics of the first of two workpieces to be aligned. The surface characteristics of the first workpiece may be inherent to the workpiece or may be added for the express purpose of alignment and/or mating. The adaptor is then precisely positioned and mounted upon the second workpiece via solder bump mounting. The precisely mounted adaptor forms the mating surfaces that the second workpiece previously lacked. When the two workpieces are then brought into contact, the adaptor mates with the physical surface characteristics of the first workpiece, providing mechanical points of contact which are used for guiding and retaining the two workpieces in highly precise and predictably aligned mating relation. When the two workpieces are aligned in a position that maximizes the points of contact between the adaptor and the physical feature of the first workpiece, the desired alignment is obtained.

In order to achieve the critical positioning afforded by solder bump mounting of the adaptor on the surface of the second workpiece, well known metalization techniques are applied to define solderable points on the surface of the second workpiece and the adaptor. In typical use, the second workpiece and the adaptor will be formed of a crystallographic material such, for example, as single crystal silicon. Such material affords highly precise metalization through known photolithographic techniques. The use of such materials also permits highly precise, highly reproducible and structurally sound adaptors to be fabricated in a variety of shapes and sizes well known to the skilled practitioner.

Because the adaptors are separately formed, and may be solder bump mounted in any appropriate orientation on the surface of the second workpiece, a significant advantage is realized in that the adaptor may be oriented so as to form elongated surface characteristics—such as grooves and/or troughs—which are out of substantial alignment with the crystallographic axes of the second workpiece. This permits the introduction of surface characteristics onto the surface of the second workpiece which were previously impossible via photolithographic etching methods known and commonly practiced in the art.

These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DESCRIPTION OF THE DRAWING FIGURES

In the drawings, wherein like reference characters denote similar elements throughout the several views.

DETAILED DESCRIPTION OF THE PRESENTLY PREFERRED EMBODIMENTS

Figure 1:
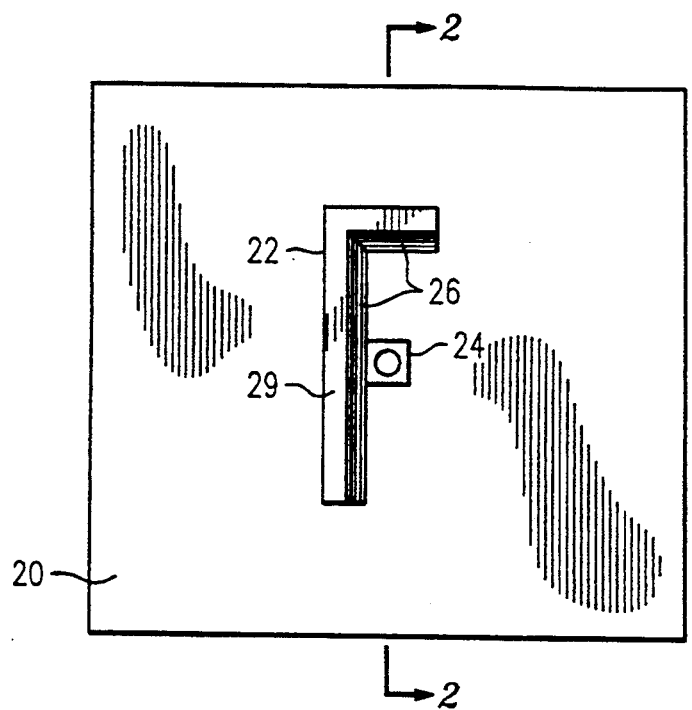
FIG. 1 is a plan view of a workpiece having an adaptor mounted to a surface thereof and a component on the same surface requiring alignment with a component of another workpiece (not shown)
Figure 2:
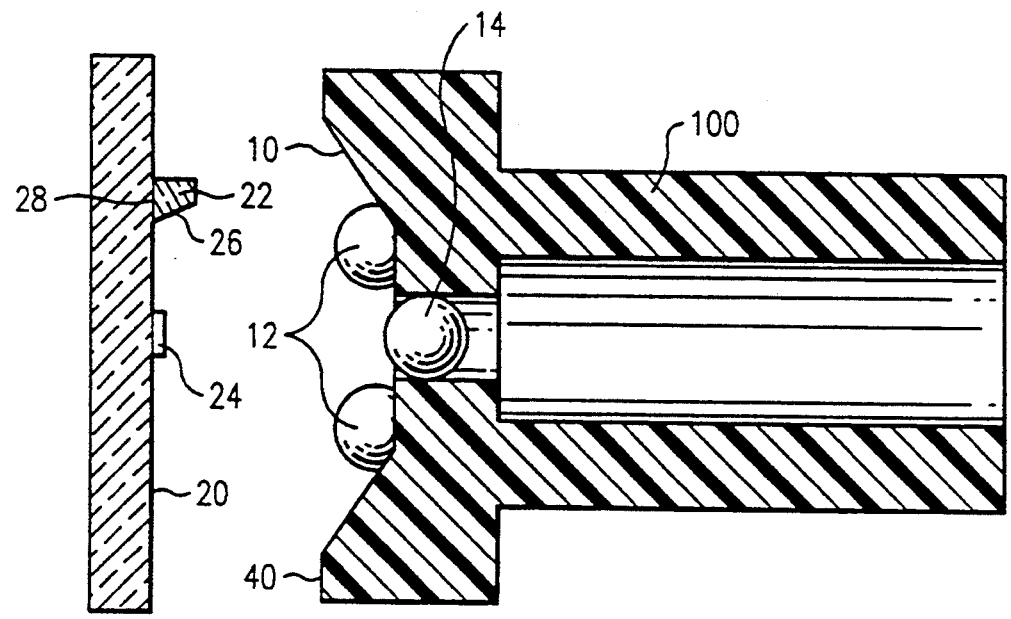
FIG. 2 is a sectional view of the workpiece bearing the adaptor taken along the line II—II in FIG. 1, but further including in section another workpiece to be mated and aligned therewith.

Referring now to FIGS. 1 and 2 in detail, there is shown a first workpiece 100 requiring mating with the surface of a second workpiece 20. The first workpiece may be formed of a thermoplastic material, as shown, or may be a crystallographic material or any other material likely to be encountered in the design and manufacture of opto-electronic components. On the second workpiece surface 20 there is a subcomponent 24 requiting critical alignment with a subcomponent 14 of the first workpiece. Subcomponent 24 may be an LED and subcomponent 14 may be a sapphire ball lens, as shown, although they may be, for example, any two subcomponents requiring alignment or precise physical registration such, for example, as two oppositely configured apertures, a fiber optic waveguide and a laser array, or any other matching components of the type typically found in circuits of this nature.

Upon the first workpiece 100 there is a surface 10 which contains physical features 12 which may be, as depicted by way of example in FIG. 2, sapphire balls. Also on the first workpiece 100 there is an annular planar surface portion 40. These physical features may also be pieces of silicon, raised portions of the workpiece material, or other surface components typically encountered in such devices. It is preferred that these surface characteristics, whether inherent or purposely contrived, be relatively permanently placed and of sufficient mechanical strength and integrity to withstand the forces typically encountered in OE component assembly.

In a preferred embodiment, the second workpiece surface 20 is the finished surface of a crystallographic material, preferably single crystal silicon, although other crystallographic materials may be used. The second workpiece may be, for example, a hybrid integrated circuit (HIC) chip, although its exact composition is a matter of design requirement or choice. For use in the instantly contemplated method, however, it is important that the second workpiece surface 20 be susceptible to precise photolithographic metalization so that portions of the surface may be selectively metalized to define predetermined solderable points. The techniques for photolithographic metalization are well known and widely practiced in the art, and permit extremely fine positioning of these metallic solder points, or solder pads, on a given surface. When the dimensions of a workpiece are known, and after component placement decisions have been made, photolithographic metalization techniques can be used to apply solder points at critical positions on the surface of the workpiece with great precision and in highly reproducible fashion, thus making it suitable for mass production.

Figure 7:
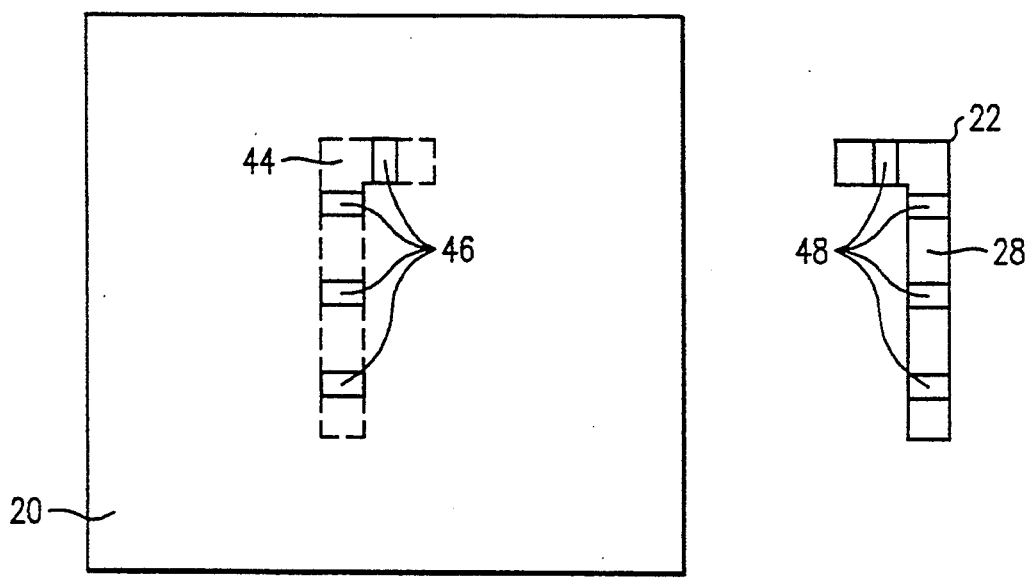
FIG. 7 is a plan view of a workpiece and the adaptor, showing a shadow-lined mounting region on the workpiece where the adaptor is to be mounted, and also showing metalized and solderable points on both elements.

Referring now to FIG. 7, there is shown in dotted lines on the second workpiece surface 20 a mounting region 44 upon which it is desired to place an adaptor 22. Utilizing the above-described photolithographic metalization technique, solder points 46 are defined on the second workpiece surface 20 in the mounting region 44. The adaptor 22 is also formed of a material susceptible to photolithographic metalization, and through this technique matching solder points 48 are defined on an adaptor surface 28 for mounting the adaptor in a desired orientation in the mounting region on the second workpiece surface. As shown in FIG. 2 and as presently preferred, the adaptor 22 is trapezoidal in cross section with the mounting surface 28 and an upper surface 29 being substantially parallel and being connected along corresponding edges by sloping mating surfaces 26.

The adaptor is also preferably formed of a crystallographic material, preferably single crystal silicon, due to its structural strength and also due to its susceptibility to fabrication techniques which yield highly predictable, readily achievable shapes with extremely fine manufacturing tolerances. In applications such as that described herein, manufacturing tolerances of approximately 1 μm or less are readily realizable utilizing known techniques of crystallographic etching and forming. The use of silicon as a structural component is described in an article entitled *Silicon as a Mechanical Material* by Peterson, published in the Proceedings of the IEEE, Vol.76, No. 5, May 1982. Likewise, the adaptor, while described as preferably single crystal silicon, may be any similar material capable of being formed to the aforementioned critical tolerances and susceptible to photolithographic metalization for the formation of solder points on its surface.

Once the solder points 46 are defined in the mounting region 44 of the second workpiece surface 20, and matching solder points 48 are defined on the mounting surface 28 of the adaptor 22, the two pieces are brought into contact and, using the well known and widely practiced technique of solder bump mounting, the adaptor 22 is soldered to the second workpiece surface 20 in the mounting region 44, resulting in the configuration depicted in FIG. 1.

Using solder bump mounting, two items to be soldered together may initially be positioned in close confronting proximity with a positioning error on the order of tens of micrometers, yet after soldering be accurately positioned within approximately one micron. This result arises from a phenomenon which occurs during soldering. Specifically, when solder is reheated thereby caused to reflow, surface tension creates centering forces causing the items being soldered to move with respect to each other so as to achieve a minimum energy configuration. This solder bump mounting technique is described in an article by M. Wale and C. Edge, *Self-Aligned Hip-Chip Assembly of Photonic Devices with Electrical and Optical Connections*, IEEE Transactions on Components, Hybrids and Manufacturing Technology, Vol. 13, No. 4, December, 1990. This phenomenon can be exploited to cause items to be pulled into extremely precise alignments, typically in the above stated approximately 1 μm range. Thus, by using an adaptor material which affords highly precise shaping, and using solder bump techniques to precisely position and fixedly mount that adaptor on the surface of the second workpiece, a finely positioned mating surface may be formed on a workpiece surface which, prior to mounting of the adaptor, was devoid of mating surfaces.

Figure 3:
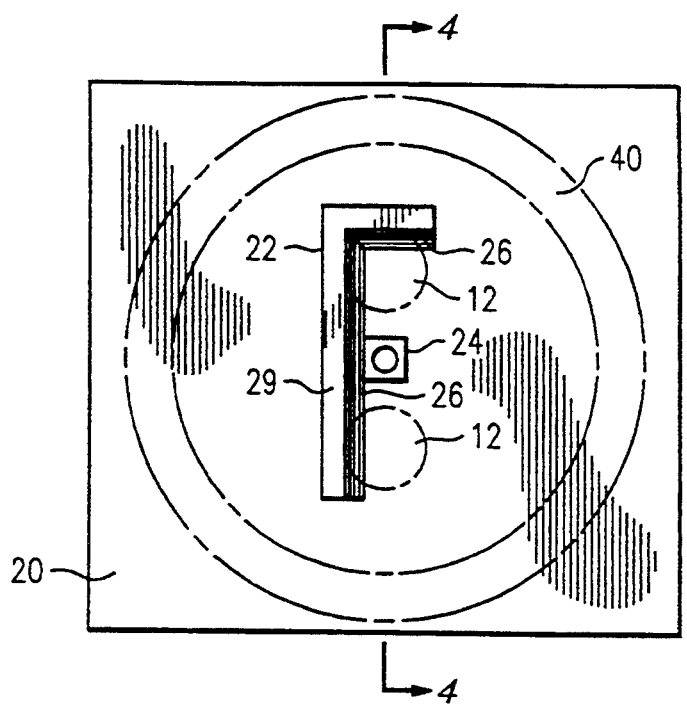
FIG. 3 is a plan view showing the workpiece surface and the adaptor of FIG. 1 with shadow lines depicting contacting spherical surfaces of its mated workpiece.
Figure 4:
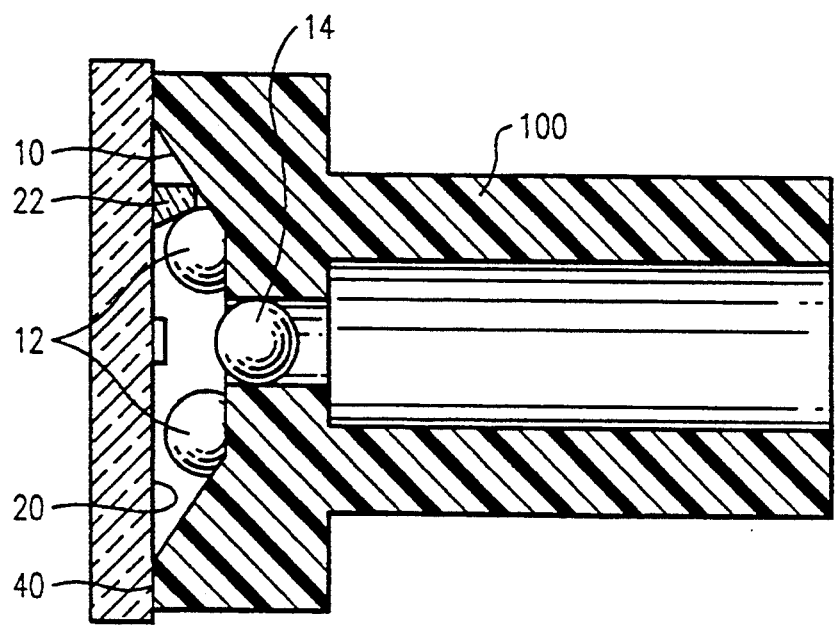
FIG. 4 is a view similar to FIG. 2 but showing the two workpieces in aligned and mated relation.

Referring now to FIG. 4, it can be seen that when the first workpiece surface 10 is brought into mating relation with the second workpiece surface 20, the sloping mating surfaces 26 of the adaptor 22 provide mating surfaces for mechanical contact with the physical features 12 of the first workpiece surface 10. Referring to FIG. 3, the physical features 12 are shown in shadow lines which depict the relative position of the physical features 12 along the adaptor surfaces 26 when the first and second workpieces are brought into contact in a contact region defined by the annular planar surface portion 40 depicted by the annular shadow line in FIG.

3. When the two workpieces are aligned in a position that maximizes the points of contact between the adaptor and the physical feature of the first workpiece, the desired alignment is obtained. FIG. 3 illustrates the adaptor surfaces 26 and physical features 12 making contact at three points, creating a highly reliable positioning guide for the orientation of the LED 24 in relation to sapphire ball lens 14. As mentioned earlier, since the adaptor may be precisely manufactured and placed, critical alignment between the LED 24 and the lens 14 is readily realizable, whereas absent the presence of the adaptor 22 such alignment would have been extremely difficult, if at all possible.

Figure 5:
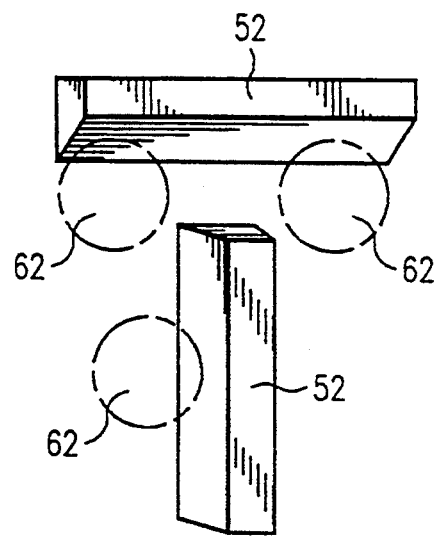
FIG. 5 is a perspective view of an alternate, multi-pan adaptor in accordance with this invention.

In the embodiment depicted in the aforementioned drawings, the adaptor was described as having a trapezoidal cross section, as perhaps best seen in FIG. 2. The skilled practitioner will recognize that other readily achievable cross sectional shapes are available, and that the shape and physical configuration of the adaptor may be easily modified to meet the particular design criteria of the particular application to which it is applied. For example, and referring now to FIG. 5, a multi-part adaptor 52 may be formed in two or more pieces for registration and contact with multiple physical features 62. Such a configuration also yields a maximum of three points of mechanical contact between the adaptor 52 and the features 62.

Figure 6:
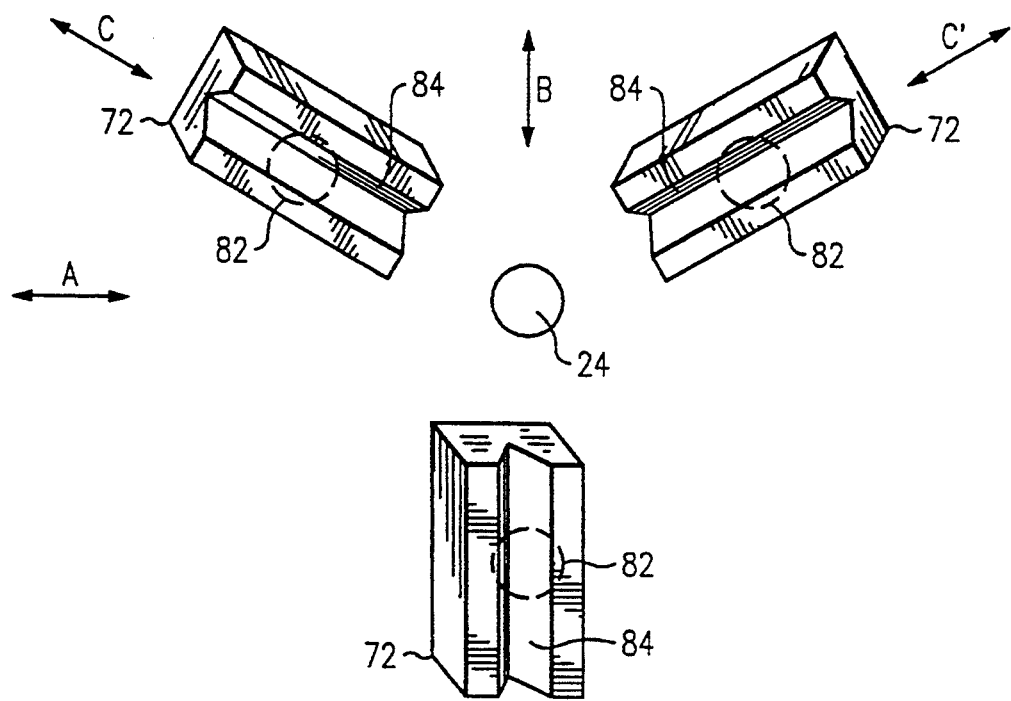
FIG. 6 is a perspective view similar to FIG. 5 but illustrating still another alternate configuration of a multi-part adaptor.

Referring now to FIG. 6, a multi-part adaptor 72 may alternately be formed of three pieces, and may be shaped as an elongated trough or V-groove 84, another readily realizable crystallographic shape. The physical features 82 may then mate with the adaptor grooves 84. This alternate configuration provides six points of mechanical contact, thereby yielding even greater reliability in mating and alignment of the desired component such as, by way of example, the LED 24 illustrated in the figure. The skilled practitioner will recognize that the size, shape and relation of the adaptor and physical features are widely variable, and that the inventive method described herein may be flexibly applied to a vast assortment of combinations to satisfy diverse design criteria.

In accordance with kinematic design principles, it is desirable to maximize the desired points of contact between two workpieces so as to minimize the degrees of freedom of movement of the workpieces relative to each other. Due to the vast array of shapes and configurations attainable from crystallographic materials in use today, the skilled practitioner will recognize that the above described method provides an extremely flexible, yet highly precise method of providing mating surfaces for the mating of two workpieces which, absent such an adaptor configuration, would have been otherwise devoid of reliable kinematic points of contact and/or alignment.

Referring once more to FIG. 6, another significant advantage of the above described method is portrayed. As is well known in the art, V-grooves 84 such as those depicted in the adaptor 72 are readily realizable surface characteristics that may be etched into crystallographic structures utilizing photolithographic etching techniques widely used in the art. However, such grooves may only be formed in substantial alignment with the primary crystallographic axes of the surface of the workpiece, depicted by way of example in FIG. 6 as the lines A and B. Thus, if it is desirable or even required by design for the adaptor grooves 84 to be out of alignment with the major crystallographic axes, such, for example, as along axes C and/or C' as depicted in FIG. 6, such a configuration would be impossible to achieve using presently known photolithographic etching techniques. The inventive method herein described thus provides the additional advantage of being able to flexibly position and orient surface characteristics, such as grooves, independently of the crystallographic axes of the workpiece material with great precision and accuracy, thereby yielding kinematic points of contact heretofore unrealizable in the art.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method of orienting first and second workpieces in a desired physical alignment by aligning a physical feature on a surface of the first workpiece with a surface of the second workpiece, thereby facilitating mating of first and second workpieces lacking directly physically matable surfaces, the method comprising the steps of:
   (a) forming an adaptor having a first adaptor surface defining a physical feature mechanically matable with the physical feature of the first workpiece and a second adaptor surface configured for mounting to the second workpiece surface;
   (b) defining a mounting region on the second workpiece surface for mountedly receiving the adaptor such that when the adaptor is mounted on the second workpiece surface the first adaptor surface defines a physical feature on the second workpiece surface configured for mechanically mating with the physical feature of the first workpiece at preselected points of contact for establishing said desired physical alignment;
   (c) selectively metalizing at least a portion of the mounting region on the second workpiece and at least a portion of the second adaptor surface to define at least one solderable point on each;
   (d) relatively positioning the adaptor and the second workpiece so that the solderable point on the second adaptor surface is disposed in close confronting relation to the solderable point on the second workpiece mounting region; and
   (e) solder bump mounting the adaptor to the second workpiece surface by soldering together the solderable points positioned in said step (d) to fixedly mount the adaptor to the second workpiece surface so that said desired physical alignment is obtained by mating said physical feature on the second workpiece surface with the physical feature of the first workpiece.

2. The method according to claim 1, additionally comprising the step of relatively moving the first and second workpiece surfaces for establishing physical contact between the second workpiece matable feature defined by the first adaptor surface and the first workpiece physical feature, thereby mechanically mating the two workpieces in said desired physical alignment.

3. The method according to claim 1, wherein the second workpiece is formed of a material having predefined crystallographic axes.

4. The method according to claim 1, wherein the adaptor is formed of a material having predefined crystallographic axes.

5. The method according to claim 3, wherein the material is single crystal silicon.

6. The method according to claim 4, wherein the material is single crystal silicon.

7. The method according to claim 1, wherein said step (c) is performed by photolithography.

8. The method according to claim 3, wherein the matable feature formed by the adaptor in said step (e) defines an elongated protrusion on the second workpiece surface.

9. The method according to claim 3, wherein the matable feature formed by the adaptor in said step (e) defines an elongated trough on the second workpiece surface.

10. The method according to claim 8, wherein the elongated protrusion defined on the second workpiece surface has a longitudinal axis that is out of alignment with the crystallographic axes of the second workpiece.

11. The method according to claim 9, wherein the elongated trough defined on the second workpiece surface has a longitudinal axis that is out of alignment with the crystallographic axes of the second workpiece.

12. The method according to claim 2, wherein said physical contact is established at at least 3 points of contact between the physical feature on the second workpiece and the physical feature on the first workpiece.

13. The method according to claim 2, wherein said physical contact is established at at least 6 points of contact between the physical feature on the second workpiece and the physical feature on the first workpiece.

14. The method according to claim 10, wherein said physical contact is established at at least 3 points of contact between the physical feature on the second workpiece and the physical feature on the first workpiece.

15. The method according to claim 11, wherein said physical contact is established at at least 6 points of contact between the physical feature on the second workpiece and the physical feature on the first workpiece.

16. The method according to claim 1, additionally comprising the step of relatively moving the first and second workpiece surfaces into a position which maximizes points of physical contact between the second workpiece matable feature defined by the first adaptor surface and the first workpiece physical feature, thereby mechanically mating the two workpieces in said desired physical alignment.

17. The method according to claim 1, additionally comprising the steps of:
providing a first workpiece having a surface selected for alignment with a surface of a second workpiece; and
identifying a physical feature on the surface of the first workpiece selected in the immediately preceding step.

18. The method according to step 17, wherein the step of identifying a physical feature on the surface of the first workpiece comprises forming a physical feature on the surface of the first workpiece.

19. The method according to claim 2, additionally comprising the step of securing the first and second workpieces in said desired physical alignment.

20. The method according to claim 16, additionally comprising the step of securing the first and second workpieces in said desired physical alignment.

21. A method of orienting two workpieces in a desired physical alignment when the two workpieces lack directly physically matable surfaces, the method comprising the steps of:
(a) selecting a surface of a first workpiece requiring alignment with a surface of a second workpiece, the second workpiece being formed of a material having predefined crystallographic axes;
(b) identifying a physical feature on the first workpiece surface;
(c) forming an adaptor of a material having predefined crystallographic axes, the adaptor having a first adaptor surface matable with the first workpiece physical feature and a second adaptor surface configured for mounting to the second workpiece surface;
(d) defining a mounting region on the second workpiece surface for mountedly receiving the adaptor such that when the adaptor is mounted on the second workpiece surface the first adaptor surface defines a precisely positioned matable feature on the second workpiece surface capable of mechanically mating with the first workpiece physical feature at preselected points of contact by which the first and the second workpieces are oriented in said desired physical alignment;
(e) selectively photolithographically metalizing at least a predetermined portion of the second workpiece mounting region and at least a predetermined portion of the second adaptor surface to define at least one solder pad on each;
(f) relatively positioning the adaptor and the second workpiece so that the solder pad on the second adaptor surface is disposed in close confronting proximity to the solder pad on the second workpiece mounting region;
(g) solder bump mounting the adaptor to the second workpiece surface by soldering together the solder pads positioned in said step (f) to fixedly mount the adapter to the second workpiece surface in the mounting region so that the first adaptor surface defines said precisely positioned matable feature on the second workpiece surface capable of mechanically mating with the first workpiece physical feature; and
(h) relatively moving the first workpiece surface and the second workpiece surface into a position which maximizes the points of contact between the second workpiece matable feature defined by the first adaptor surface and the first workpiece physical feature so as to mechanically mate the two workpieces in said orientation of desired physical alignment.

22. The method according to claim 21 wherein the material of said step (a) and said step (c) is single crystal silicon.

23. A method of orienting two workpieces in a desired physical alignment when the two workpieces lack directly physically matable surfaces, the first workpiece having a physical feature on a first workpiece surface requiting alignment with a surface of a second workpiece, the second workpiece having a mounting region on the second workpiece surface for mountedly receiving an adaptor having a first adaptor surface matable with the first workpiece physical feature and a second adaptor surface configured for mounting to the second workpiece surface such that when the adaptor is mounted on the second workpiece surface the first adaptor surface defines a precisely positioned matable feature on the second workpiece surface capable of mechanically mating with the first workpiece physical feature at preselected points of contact by which the first and the second workpieces are oriented in said desired physical alignment, the second workpiece mounting region having at least a predetermined portion that has been selectively metalized and the adaptor having at least a predetermined portion of the second adaptor surface that has been selectively metalized to define at least one solderable point on each, the adaptor being solder bump mounted to the second workpiece surface by relatively positioning the adaptor and the second workpiece so that the solderable point on the second adaptor surface is disposed in close confronting proximity to the solderable point on the second workpiece mounting region and by soldering together the solderable points to fixedly mount the adapter to the second workpiece surface in the mounting region so that the first adaptor surface defines said precisely positioned matable feature on the second workpiece surface capable of mechanically mating with the first workpiece physical feature, the method comprising the step of:

relatively moving the first workpiece surface and the second workpiece surface into a position of physical contact between the second workpiece matable feature defined by the first adaptor surface and the first workpiece physical feature so as to mechanically mate the two workpieces in said orientation of desired physical alignment.

24. The method according to claim 23, wherein said step further comprises relatively moving the first workpiece surface and the second workpiece surface into a position which maximizes the points of contact between the second workpiece matable feature defined by the first adaptor surface and the first workpiece physical feature so as to mechanically mate the two workpieces in said orientation of desired physical alignment.

25. A method of orienting first and second workpieces in a desired physical alignment by aligning a physical feature on a surface of the first workpiece with a surface of the second workpiece, thereby facilitating mating of first and second workpieces lacking directly physically matable surfaces, the method comprising the steps of:

(a) forming an adaptor of a material having predefined crystallographic axes, the adaptor having a first adaptor surface matable with the first workpiece physical feature and a second adaptor surface configured for mounting to the second workpiece surface;

(b) defining a mounting region on the second workpiece surface for mountedly receiving the adaptor such that when the adaptor is mounted on the second workpiece surface the first adaptor surface defines a precisely positioned matable feature on the second workpiece surface capable of mechanically mating with the first workpiece physical feature at preselected points of contact by which the first and the second workpieces are oriented in said desired physical alignment;

(c) selectively photolithographically metalizing at least a predetermined portion of the second workpiece mounting region and at least a predetermined portion of the second adaptor surface to define at least one solder pad on each;

(d) relatively positioning the adaptor and the second workpiece so that the solder pad on the second adaptor surface is disposed in close confronting proximity to the solder pad on the second workpiece mounting region; and (e) solder bump mounting the adaptor to the second workpiece surface by soldering together the solder pads positioned in said step (d) to fixedly mount the adapter to the second workpiece surface in the mounting region so that said desired physical alignment is obtained by mating said precisely positioned matable feature on the second workpiece surface with the first workpiece physical feature.

26. The method according to claim 25, additionally comprising the step of relatively moving the first workpiece surface and the second workpiece surface for establishing physical contact between the second workpiece matable feature defined by the first adaptor surface and the first workpiece physical feature so as to mechanically mate the two workpieces in said desired physical alignment.

27. The method according to claim 25 wherein the material of said step (a) and said step (c) is single crystal silicon.

28. The method according to claim 25 additionally comprising the step of relatively moving the first and second workpiece surfaces into a position which maximizes points of physical contact between the second workpiece matable feature defined by the first adaptor surface and the first workpiece physical feature, thereby mechanically mating the two workpieces in said desired physical alignment.

\* \* \* \* \*